Patented Mar. 26, 1929.

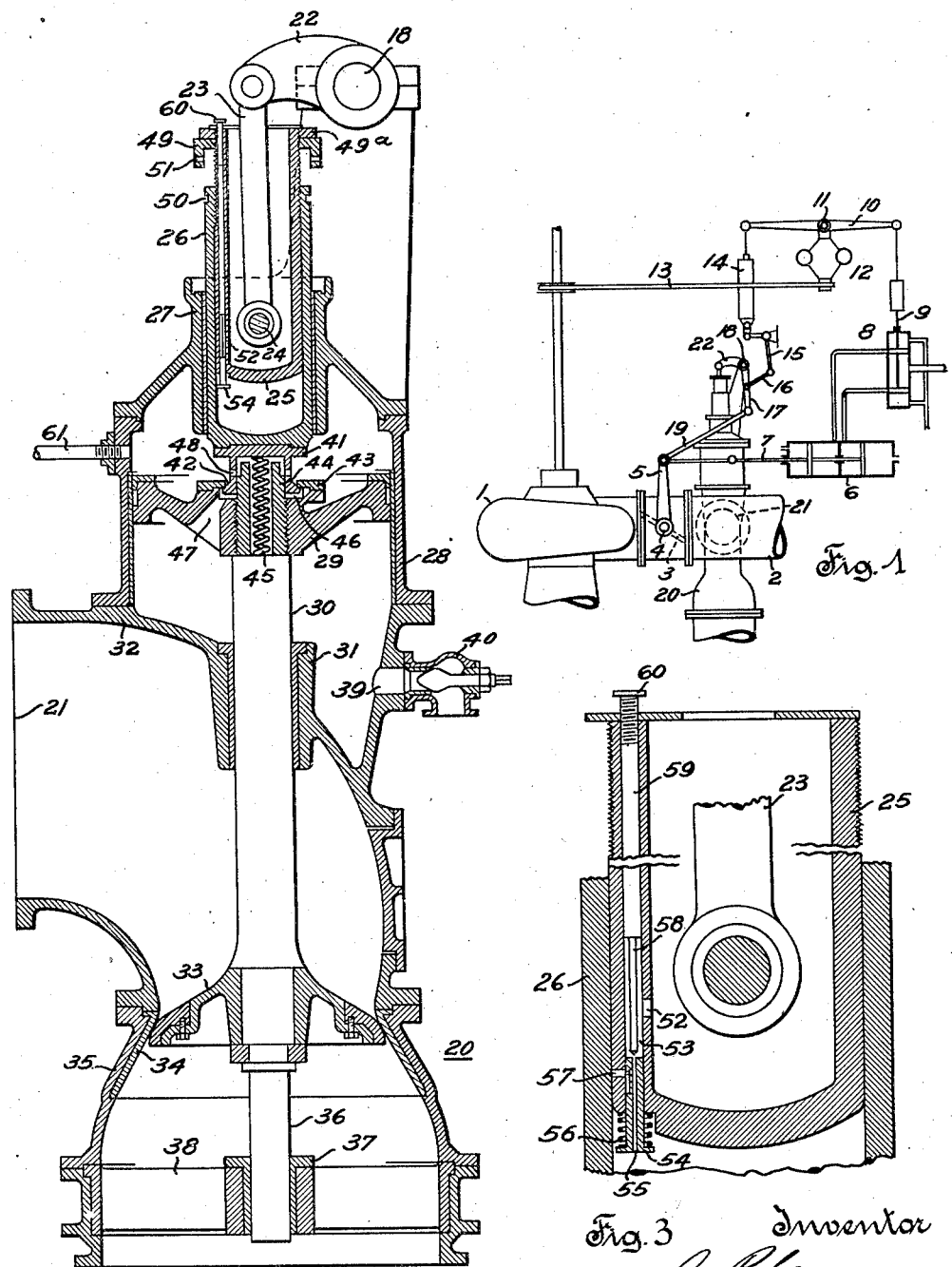

1,706,813

UNITED STATES PATENT OFFICE.

ARNOLD PFAU, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

CONTROL SYSTEM FOR HYDRAULIC TURBINES AND THE LIKE.

Application filed October 30, 1926. Serial No. 145,163.

This invention relates to control systems for hydraulic turbines and the like.

In cases where hydraulic turbines are supplied through a conduit and controlled by means of a gate or other admission controlling means it is undesirable to rapidly change the amount of water flowing to the turbine in view of the development of either excessive pressure in the conduit or excessive negative pressure. It has consequently been the practice to provide such a conduit with a relief device or pressure regulator. The present invention relates more particularly to systems in which use is made of a pressure regulator which comprises a normally closed valve serving to regulate the amount of water flowing from a by-pass connected to the conduit between the turbine gates and the source of water. It is an object of this invention to improve systems of this character by an increase of simplicity and reliability.

Another object of the invention is to provide a system of control in which the source of power for operating the turbine gate may be reduced to a minimum size. For the sake of brevity the term servo-motor will hereinafter be used to designate the source of power for operating the turbine gate although other sources of power may be utilized.

Still another object is to provide a system in which under normal conditions practically no power is required from the servo-motor for causing operation of the pressure regulator.

A further object is to provide a system in which if the pressure regulator sticks or fails to operate in a normal manner it will have force applied thereto by the servo-motor; and if the servo-motor fails to effect operation of the pressure regulator rapid motion of the servo-motor and consequently either rapid closing or opening of the turbine gate, or both, according to the adjustment of the system, is prevented; or in which under certain conditions failure of the pressure regulator to move will also prevent movement of the turbine gate.

A still further object of the invention is to provide a control system in which the turbine gate may close slowly a predetermined amount without the pressure regulator being caused to open, or, in which the pressure regulator will be caused to open synchronously with the closing movement of the turbine gate, or, in which the pressure regulator will be caused to open or close synchronously with the closing or opening movement respectively of the turbine gate, at will.

Other objects will appear hereinafter as the description of the invention proceeds.

The novel features of the invention will appear from this specification and the accompanying drawing forming a part thereof and disclosing one embodiment of the invention, and all these novel features are intended to be pointed out in the claims.

In the drawing:

Fig. 1 is a diagrammatic view of a system of control for a hydraulic turbine, embodying the invention.

Fig. 2 is a cross-sectional elevation of the pressure regulator proper which may be used in such a system as in Fig. 1.

Fig. 3 is an enlarged detail portion of Fig. 2.

Referring to Fig. 1 of the drawing there is here shown a turbine 1 which may be supplied with water through a conduit 2. The admission of water to the turbine may be controlled by any suitable well known means such as the guide vanes of the turbine or in the case of an impulse wheel, the needle of the nozzle. For the sake of simplicity of illustration the admission controlling means for the turbine will hereinafter be termed a gate and such means is diagrammatically represented by a valve 3 pivoted at 4 and operable by means of a crank 5. The crank 5 may be swung back and forth by means of a servo-motor 6 having a piston rod 7 linked in any suitable manner to the crank 5. If the source of power for operating the gate is a servo-motor as illustrated, it may be controlled by a regulating valve 8 of well known form which valve is adapted to control the admission of fluid under pressure to either one or the other of a pair of chambers for the purpose of moving the piston rod in either one or the other direction. The regulating valve 8 is here shown in its neutral position in which it closes the ports in both said chambers. The regulating valve may be connected through a stem 9 in a suitable manner to one end of a floating lever 10 having a floating pivot 11 the position of which may be controlled by means of fly balls 12 which may be driven in any suitable manner as by means of a belt 13 from the turbine. The other end of the floating lever 10 has one element of a dash pot 14 or compensating device connected thereto and the other element of the dash pot may be connected to a bell crank 15 in turn connected by a link 16 to a lever 17 keyed to a rock shaft 18. The lever 17 may be connected by means of a link 19 to the crank 5. Obviously motion may be transmitted from the crank 5 or servo-motor to the lever 17 and compensating device 14 in any other suitable manner.

The pressure regulator here shown includes a relief valve 20 shown in outline and this relief valve is adapted to control the exit of water from an opening 21 in the conduit 2, the opening 21 being at some desired point between the gate 3 and the source of water. The relief valve is operable by means of a crank or lever 22 keyed to the rock shaft 18, in a manner to be set forth.

Referring now to Fig. 2, the crank 22 is adapted to reciprocate a rod 23 which is pivotally connected at 24 to a piston 25 adapted to operate in a cylinder or dash pot 26. The dash pot is filled with a fluid, preferably oil, which may extend into the hollow piston 25. The cylinder 26 may be provided with a guide 27 here shown as mounted on a cylinder 28. Disposed in cylinder 28 is a piston 29 provided with a piston rod 30 guided by means of a bushing 31 formed in an elbow 32. The opening 21 of elbow 32 corresponds with the opening 21 of Fig. 1. For the sake of clearness, the lever 22 has in Fig. 1 been turned 90° so as to bring it into the plane of the paper. It will be noted that in Fig. 2 the lever 22 and the elbow 32 are in the same general plane. The piston rod 30 carries a movable valve member 33 adapted to cooperate with a valve seat 34 which is here shown as part of a discharge bell 35 suitably attached to the elbow 32. The rod 30 may be provided with an extension 36 which may be guided in a bushing 37 supported by a spider 38 associated with the bell 35.

Fluid under pressure may be admitted to the cylinder 28 below the piston 29 through a port 39 and the pressure and amount of fluid admitted may be adjusted by means of a reducing valve 40. The fluid admitted through valve 40 may be obtained from any suitable source such as the conduit 2 or if desired a source of constant pressure. The upward pressure on piston 29 is normally sufficient to overcome the downward pressure on valve 33.

Suitably attached to the lower end of cylinder 26 is an extension 41 here shown as hollow. The end of member 41 is formed to provide a movable valve member 42 adapted to cooperate with a valve seat 43 associated with the piston 29. The member 41 is disposed about a hollow projection 44 on the rod 30. Within the hollow portion of projection 44 a spring 45 may be disposed acting against the member 41 to lift the same (and consequently also the cylinder 26) against the valve seat 44. A predetermined small clearance 46 is provided between the end of the valve member 42 and the bottom of a recess in the piston 29. A passage 47 is provided in the piston 29 which passage communicates with the valve 42, 43. One or more openings 48 may be provided in member 41 to allow the free escape of fluid from within the member 41.

The upper end of cylinder 25 may be threaded to receive the threaded flanged ring 49 which may be held in a desired position by means of a lock nut 49ª. The flanged ring 49 is provided with one or more threaded holes 51 through which studs or set screws may be screwed to engage an annular slot 50 in the cylinder 26, when the holes 51 and the slot 50 are brought into registry.

The piston 25 is provided with an adjustable by-pass including a hole 52. For a clearer view of the construction of this by-pass reference may be had to Fig. 3. The hole 52 communicates with a longitudinal hole 53 here shown as extending in the wall of the piston 25 from one end thereof to the other. In the lower end of this hole is slidably fitted a movable member 54 provided with a longitudinal hole 55. The member 54 is held in the position illustrated by means of a spring 56 tending to push the member 54 out of the hole 53. The extent of outward motion of the member 54 is limited by means of a pin 57 a portion of which extends into a slot in the side of member 54. The inner end of the member 54 is adapted to cooperate with a needle valve 58 of smaller diameter than the hole 53. The needle valve 58 is provided with an operating stem 59 rotatably fitted in the hole 53. The upper end of the stem 59 may be threaded and rotated by means of a thumb piece 60.

The operation of the system is as follows:

Assuming the parts to be in the position shown in Fig. 1 with the gate 3 partially open and the turbine revolving, if now the turbine tends to increase very slightly in speed the fly balls 12 will slightly lower the stem 9 of the regulating valve to thereby admit a small amount of fluid under pressure to the righthand chamber of the servo-motor 6. The gate 3 is therefore slowly moved toward the closed position and this motion is relayed through the linkage 19, 17, 16, 15 and through the dash pot 14 to thereby return the regulating valve to its neutral position. These operations occur substantially simultaneously in a well known manner to thereby slowly close the gate 3 an amount sufficient to reduce the speed of the turbine to normal. Such predetermined slow motion of the gate 3 causes a corresponding slow motion of the rock shaft 18 in a counter clockwise direction thereby slowly moving the piston 25 downwards, as viewed in Fig. 2. The oil in the dash pot 26 is thereby caused to flow through the by-pass including holes 55 and 52 and into the hollow piston 25. The motion of the piston 25 now under consideration is produced by such a force on said piston that it is permitted to move slowly into the dash pot 26 without effectively compressing spring 45, and the valve 42, 43 therefore remains closed. Inasmuch as the piston 29 is under fluid pressure through the port 39 and as the total force tending to move the piston 29 upwardly is greater than the total force tending to open the valve 33, the latter remains closed.

If it be assumed on the other hand that a speed change occurs which requires a more rapid correction the regulating valve stem 9 will be moved as hereinbefore stated but to a greater extent thereby tending to move the gate 3 at a predetermined speed and also the piston 25. The force applied to move the piston 25 downwardly will then under these predetermined conditions be such that the downward motion of the piston will also move the cylinder 26 downwardly compressing spring 45 and opening valve 42, 43 to a predetermined extent. Liquid is therefore permitted to escape through passage 47 and valve 42, 43 into the drain pipe 61 thereby lowering the total pressure on the piston 29 to a predetermined extent and permitting the pressure on valve 33 to open said valve to a predetermined extent accordingly. The downward motion of piston 29 tends to close the valve 42, 43 by reason of the valve seat 43 following the valve member 42. However, the dash pot 26 may still be moving downwardly under the influence of piston 25 so that the valve 42, 43 remains open a predetermined extent. Thus any increase of pressure in the conduit 2 tended to be caused by the closing movement of gate 3 is prevented by the opening of the valve 33 to the predetermined required extent depending upon the force applied to the piston 25 tending to move it downwardly at a predetermined rate. When the gate 3 has been closed an amount sufficient to bring the turbine back to normal speed so that no further downward pressure is applied to piston 25 the spring 45 returns the valve 42, 43 to its closed position and there being no further chance for escape of liquid from the cylinder 28 the piston 29 is again lifted to close the valve 33. The piston 25, as will be obvious, has now assumed a new position with respect to the dash pot 26 by reason of the gate 3 being closed to a greater extent than shown in Fig. 1.

If it be assumed that the speed increase or tendency for a speed increase of the turbine is of a predetermined large degree the gate 3 will tend to move toward closed position very rapidly and the piston 25 will have a predetermined large force applied thereto tending to move it downward at a predetermined rapid rate. Under these conditions the member 54 will be under sufficient pressure from the oil in the dash pot 26 so that the spring 56 will be compressed the member 54 moving upwardly and seating the opening of hole 55 on the needle valve 53 thereby closing the by-pass. The piston 25 and cylinder 26 therefore act as though mechanically coupled and the valve member 42 will at once be moved downward, taking up the clearance 46 and come into engagement with the upper end of the piston 29. The opening of the valve 42, 43, as before described, causes a maximum decrease of pressure in the cylinder 28 thereby causing the opening of valve 33 as previously described. If the valve 33 sticks the engagement of valve member 42 with the piston 29 and the resultant direct application of force from the servo-motor to the valve 33 will tend to open the valve. If the valve nevertheless fails to open it will clearly prevent closing movement of the gate 3 thus preventing pressure rise in the conduit 2 which might be caused by sudden closing of the gate. Slow leakage through the by-pass 52, 55 may permit, under predetermined conditions, the gate 3 to close at a very slow rate such that the pressure could not rise to any excessive degree. Such slow leakage may be secured, for example, by adjusting the needle 58 so that when member 54 is pressed upwardly its maximum amount, as limited by the engagement of the lower end of the slot therein against pin 57, the upper end of opening 55 will not quite seat on the needle 58.

Assuming that the gate 3 has been closed or stable conditions on the turbine have been reached so that downward movement of the gate 3 and consequently of piston 25 and dash pot 26 stops, the valve 33, having been opened as gate 3 moved toward closed position, will be caused to close at a predetermined rate as follows. The valve 42, 43 will be gradually closed by reason of the spring 45 lifting the dash pot 26. The piston 25 being stationary, the rate of movement of dash pot 26 will be determined by the by-pass 52 which at that time is open, the spring 56 having returned the member 54 to the position shown in Fig. 3. As the valve 42, 43 closes, the pressure within cylinder 28 rises and acts to lift the piston 29. The rate of rise of piston 29 and consequent closure of valve 33 will clearly depend on the rate of rise of valve member 42 and on the setting of the reducing valve 40. The valve 33 may therefore be caused to close at a safe rate.

If the gate 3 be assumed to be moving from a closed position toward an open position, the member 54 is of course in the position shown in Fig. 3 and the valve member 42 is lifted against its seat 43 because of the partial vacuum produced by the upward pull of piston 25 in dash pot 26. The valve 33 will of course be closed by water admitted to cylinder 28 and at a rate dependent upon the adjustment of reducing valve 40 and the relative upward movements of valve member 42 and valve seat 43. If the valve 33 sticks the opening movement of gate 3 will be retarded because of the partial vacuum created by the upward movement of piston 25 and consequent drag thereon of dash pot 26 the upward movement of which latter is directly prevented or retarded by the valve seat 43 acting against the valve member 42. The retardation of the opening movement of gate 3 under these conditions is desirable in order to prevent the undue acceleration of water in conduit 2 and consequent undue under pressure in the conduit.

In the previous description it has been assumed that the flanged ring 49 is in its uppermost position as shown on the drawing. It will be clear that when the piston 25 moves downward a predetermined extent the ring 49 will engage the top of the dash pot 26 thereby causing the latter and the piston 25 to move in unison. When such a position is reached the valve 42, 43 will be opened at once when there is any movement of the gate 3 toward closed position thereby also opening the valve 33. For the closing movement of the gate 3, therefore, the latter and the valve 33 move synchronously. The relative position of piston 25 and dash pot 26 in which such synchronous action will take place may be varied by adjusting the flanged ring 49 to any desired position.

If the flanged ring 49 is fastened to the dash pot 26 by means of set screws as hereinbefore described it is clear that the movement of the valve member 42 will follow that of the gate 3 not only when the gate moves toward closed position but also toward open position so that, for example, if it be assumed that the valve 33 is open and the gate 3 is moved toward open position the valve 42, 43 will close and the upward movement of the cylinder 26 will mechanically move the valve 33 toward closed position in a manner analogous to that in which it may mechanically move said valve toward the open position. Thus excessive negative pressures in the conduit 2 are prevented. In case the valve fails either to close or open in response to the operation of the valve 42, 43, the fact that the piston 25 and dash pot 26 are locked together will either cause the servo-motor to force the valve to move in the respective direction or the failure of the valve to move at all will prevent any movement of the gate 3.

It should be understood that it is not desired to limit the invention to the exact details of construction shown and described, for obvious modifications may occur to persons skilled in the art.

It is claimed and desired to secure by Letters Patent:

1. In a hydraulic turbine control system, a conduit for conveying water to the turbine, a gate for the turbine, a servo-motor for operating said gate, a pressure relief valve associated with said conduit, fluid operated means for operating said relief valve, and means whereby said servo-motor is adapted to cause actuation of said relief valve through said fluid operated means and under predetermined conditions is adapted to directly actuate said relief valve.

2. In a hydraulic turbine control system, a conduit for conveying water to the turbine, a gate for the turbine, a servo-motor for operating said gate, a pressure relief valve associated with said conduit, and means whereby said servo-motor may be so connected to cause opening of said relief valve if said servo-motor moves at a predetermined rate and will not cause opening of said relief valve if said rate is slower until said servo-motor has moved from a predetermined open position a predetermined amount toward closed position.

3. In a hydraulic turbine control system, a conduit for conveying water to the turbine, a gate for the turbine, a servo-motor for operating said gate, a pressure relief valve associated with said conduit, means whereby said servo-motor may be so connected to cause opening of said relief valve if said servo-motor moves at a predetermined rate and will not cause opening of said relief valve if said rate is slower until said servo-motor has moved from a predetermined open position a predetermined amount toward closed position, and means for adjusting said predetermined amount of movement to make it either zero or a greater amount within the limits of adjustment.

4. In a hydraulic turbine control system, a conduit for conveying water to the turbine, a gate for the turbine, a servo-motor for operating said gate, a pressure relief valve associated with said conduit, means adapted to cause opening of said relief valve in response to a predetermined movement of said servo-motor, and means whereby resistance of said relief valve to opening movement causes the movement of said servo-motor to be resisted.

5. In a hydraulic turbine control system, a conduit for conveying water to the turbine, a gate for the turbine, a servo-motor for operating said gate, a pressure relief valve associated with said conduit, means adapted to cause opening or closure of said relief valve in response to a predetermined movement of said servo-motor toward closed or open position respectively, and means whereby resistance of said relief valve to movement in either direction causes the corresponding movement of said servo-motor to be resisted.

6. In a hydraulic turbine control system, a conduit for conveying water to the turbine, a gate for the turbine, a servo-motor for operating said gate, a pressure relief valve associated with said conduit, means adapted to cause opening of said relief valve by power other than said servo-motor in response to tendency of said servo-motor to move at a predetermined rate, means whereby when said servo-motor tends to move at a predetermined rate a direct mechanical connection is made between said servo-motor and said relief valve, and means whereby when said servo-motor tends to move at a predetermined slower rate said relief valve is not opened.

7. In a hydraulic turbine control system, a conduit for conveying water to the turbine, a gate for the turbine, a servo-motor for operating said gate, a pressure relief valve associated with said conduit, a connection between said servo-motor and said relief valve including a dash pot, a single bypass for said dash pot, and a valve for said bypass movable toward closed position by a predetermined pressure in said dash pot.

8. In a hydraulic turbine control system, a conduit for conveying water to the turbine, a gate for the turbine, a servo-motor for operating said gate, a pressure relief valve associated with said conduit, a fluid pressure operated piston for holding said relief valve closed when a predetermined fluid pressure is applied to said piston, a lost motion connection between said servo-motor and said relief valve, means whereby said lost motion connection is adapted to control said fluid pressure, and means whereby when said lost motion is taken up said servo-motor is adapted to apply force directly to said relief valve.

9. In a hydraulic turbine control system, a conduit for conveying water to the turbine, a gate for the turbine, a servo-motor for operating said gate, a pressure relief valve associated with said conduit, a fluid pressure operated piston for holding said relief valve closed when a predetermined fluid pressure is applied to said piston, said piston having a passage from one side to the other thereof, a movable valve member adapted to control said passage, means for biasing said valve member to closed position, a connection between said servo-motor and said valve member, and means whereby force may be transmitted from said servo-motor for directly operating said relief valve.

10. In a hydraulic turbine control system, a conduit for conveying water to the turbine, a gate for the turbine, a servo-motor for operating said gate, a governor responsive to the speed of said turbine for controlling said servo-motor, a pressure relief valve associated with said conduit, means whereby predetermined regulating effects produced by said governor cause actuation of said relief valve by an agency other than said servo-motor, and means whereby other predetermined regulating effects produced by said governor cause said servo-motor to apply force directly to said relief valve.

11. In a hydraulic turbine control system, a conduit for conveying water to the turbine, a gate for the turbine, a servo-motor for operating said gate, a pressure relief valve associated with said conduit, a connection between said servo-motor and said relief valve including a dash pot, a by-pass for said dash pot, means responsive to the pressure within said dash pot for controlling the amount of flow through said by-pass, and means for adjusting the minimum amount of flow.

12. In a hydraulic turbine control system, a conduit for conveying water to the turbine, a gate for the turbine, a servo-motor for operating said gate, a pressure relief valve associated with said conduit, means adapted to cause opening or closure of said pressure relief valve by an agency other than said servo-motor in response to a predetermined movement of said servo-motor toward closed or open position respectively, means whereby resistance of said relief valve to movement in either direction causes the corresponding movement of said servo-motor to be resisted, adjustable means whereby with one adjustment said servo-motor at a predetermined application of force to said gate is adapted to cause movement of said gate but not of said relief valve and with another adjustment said servo-motor at the same predetermined application of force is adapted to cause movement of both the gate and relief valve.

In testimony whereof, the signature of the inventor is affixed hereto.

ARNOLD PFAU.